United States Patent [19]

Lee et al.

[11] Patent Number: 4,862,115
[45] Date of Patent: Aug. 29, 1989

[54] OPTICAL BEAMFORMERS

[75] Inventors: John N. Lee, Silver Spring, Md.; Ravindra A. Athale, Burk, Va.; Peter B. Rolsma, Edgewater, Md.

[73] Assignee: The United States of America as represented by the Secretary of the Navy, Washington, D.C.

[21] Appl. No.: 155,434

[22] Filed: Feb. 12, 1988

[51] Int. Cl.[4] .................. G06G 9/00; G01S 13/58; H01J 40/14
[52] U.S. Cl. .................. 332/7.51; 364/822; 367/123
[58] Field of Search ......... 332/7.51; 367/61, 122–124, 367/129; 364/822

[56] References Cited

U.S. PATENT DOCUMENTS

| | | | |
|---|---|---|---|
| 3,614,722 | 10/1971 | Jones | 364/138 |
| 3,872,293 | 3/1975 | Green | 364/827 |
| 4,080,838 | 3/1978 | Kuroda et al. | 367/138 |
| 4,460,987 | 7/1984 | Stokes et al. | 367/138 |
| 4,503,336 | 3/1985 | Hutchin et al. | 364/726 |
| 4,505,544 | 3/1985 | Blodgett et al. | 364/822 |
| 4,531,195 | 7/1985 | Lee | 364/822 |
| 4,559,605 | 12/1985 | Norsworthy | 367/64 |
| 4,569,033 | 2/1986 | Collins et al. | 364/845 |

OTHER PUBLICATIONS

Optical Society of America, 1986 Annual Meeting (Oct. 19–25, 1986), technical digest, p. 73.
Viewgraphs of Rolsma et al., "Optical Time-Domain Beamformer Implimentation".
P. B. Rolsima, R. D. Griffin, and J. N. Lee, "Optical Implementation of a Time-Domain Beam Former," Optics Letters 11, 821 (Dec. 1986).
Griffin et al, "Analysis and Experimental...", 5/28/87, NTIS Publ. Ad-A182-129/7/XAB.
Lee et al, "Acousto-Optic Techniques for...", 10/16/87, IEEE 1987 Ultrasonics Symp. Proc., 1186 PP, p. 475, vol. 1.
Lin et al, "Compact Optical Pulse...", 8/24/83, NTIS AD.A/132 152/0, 27 pages.
Herezfeld et al., "Fiber-optic Feed Network...", 8/87, Microwaved, vol. 30, #8, pp. 160–166.

Primary Examiner—Nelson Moskowitz
Attorney, Agent, or Firm—Thomas E. McDonnell; Edward F. Miles

[57] ABSTRACT

Disclosed as a beamforming system, particularly useful for seismic exploration or undersea surveillance, in which data processing of the system is done optically. Sensor outputs are subjected to plural sets of time delays, and the system beams formed optically. Four embodiments are presented of the optical processing hardware.

7 Claims, 5 Drawing Sheets

OPTICAL BEAMFORMERS

FIELD OF THE INVENTION

This invention pertains to beamforming techniques in non-dispersive media, and in particular undersea seismic investigation and surveillance

BACKGROUND OF THE INVENTION

The increasing sophistication of undersea seismic investigation, and the increasing quietness of seagoing vessels, mandates that the detectors used in such exploration and surveillance be made correspondingly more sensitive. Beamforming systems, comprised most generally of an array of sensors combined with data processing equipment, have been used for some time to perform these functions. Beamforming is the process of signal detection in a non-dispersive medium in which output signals of a plurality of sensors are sampled at preselected times, so that a wavefront traversing the sensors in phase with the sampling of the sensors will generate outputs that reinforce when added together into one signal, or beam, greatly increasing the signal-to-noise ratio over one sensor alone. The specific times at which to sample depends on sensor geometry (spatial dispositon of the sensors with respect to one another) and the desired angle of wavefront incidence (the "look angle"). By submitting sampled sensor outputs to plural sets of time delays before beamforming, the beamformer system then has plural look angles, defining a particular field of view and angular sensitivity for such a beamformer system. Unfortunately, to increase beamformer sensitivity and angular resolution requires a corresponding increase in the number of beamformer sensors, and the amount of data processing hardware. Because these beamformers optimally are located in the field, i.e. at sea, the platforms upon which to mount such beamformers, and the power sources available are usually predetermined by concerns other than optimal operation of the beamformers. Therefore, any change in beamformer design that can reduce the space occupied by these beamformers, increase their speed of operation, and reduce their power consumption would be most welcome. Optical processing equipment is inherently quicker, smaller and lighter than its conventional equivalents, and, because optical devices are more readily adapted to processing in parallel, optical processors are especially well suited to meeting the needs of the art.

SUMMARY OF THE INVENTION

Accordingly, an object of the invention is to reduce the weight, size, and power consumption of beamformers by performing beamforming operations with optical devices.

Another object of the invention is to increase the sensitivity of beamformers without increasing their size, weight, or power consumption, also by performing beamformer operations optically.

Another object of the invention is to increase the speed of beamforming by doing so optically and by performing plural such beamforming operations in parallel.

In accordance with these and other objects that shall become apparent hereinafter the present invention has an array of beamforming sensors whose output signals are optically processed, submitted in parallel to plural sets of time delays, and formed into plural sets of beams. Four different embodiments of the optical hardware that performs the delaying and summing functions are presented.

The invention is more fully understood from the following detailed description of preferred embodiments it being understood, however, that the invention is capable of extended application beyond the precise details of preferred embodiments. Changes and modifications can be made that do not affect the spirit of the invention nor exceed its scope, as expressed in the appended claims. Accordingly, the invention is described with particular reference to the accompanying drawings, wherein:

DETAILED DESCRIPTION OF PREFERRED EMBODIMENTS

The invention will now be described with reference to the drawing figures, and in particular to FIG. 1, which shows schematically a system 1 for optical beamforming. Beamforming system 1 has a plurality of N sensors disposed in a non-dispersive medium that supports waves such as that illustrated by wavefront 25. These sensors 15 can be hydrophones in water, and the following discussion assumes this by way of example and illustration of preferred embodiments. However, the instant invention is broader in scope than the particular preferred embodiments, and is applicable to any array of sensors disposed in any non-dispersive medium (e.g. sensors for electro-magnetic radiation). The output of each sensor 15 is amplified a preselected amount by an associated signal multiplier 19, the ultimate purpose of which is to modify system side-lobes in a manner well known to those skilled in this art. The amplified output of each sensor 15 is delayed by an associated time delay 21, and added to signals from the other sensors 15 at summer 10. This summing is not required to be done continuously, but rather the outputs of sensors 15 can be sampled at periods appropriate for the expected frequencies of wavefronts such as 25, in accord with well-known sampling principles.

As wavefront 25 propagates across the array of sensors 15, the output of each sensor 15 in turn responds to the wavefront. If the incidence angle $\theta$ of wavefront 25 causes the travel time between sensors 15 to match, or closely approximate, time delays 21, then the signals summed at 10 will reinforce, greatly increasing system 1's signal to noise ratio. This is the process of beamforming, and by appropriately choosing sensor geometry (the placement of sensors 15 with respect to one another), and the time delays 21, one in effect "tunes" system 1 to one angle of incidence $\theta$ (or "look" angle), from which direction wavefronts traversing system 1 are detected optimally. This unique relationship between incidence angle $\theta$, on the one hand, and time delays 21, on the other hand, for a given geometry of the array of sensors 15 implies that, by submitting the outputs of sensors 15 to plural sets, rather than one set, of time delays and summations, a system such as 1 would then have a corresponding plurality of optimal look angles $\theta$, resulting in an increase of angular sensitivity of system 1. Sampling need not be triggered by the presence of a wavefront. As a wavefront traverses the array of sensors at an optimal look angle, it strikes each sensor at constant phase with respect to sampling, and, when summed, the outputs of these sensors will distinguish in magnitude from white noise, or wavefronts not incident at system look angles. However, any wavefront incident upon the detector array at an optimal look angle will be detected regardless of the absolute value of the phase at which such a wavefront strikes the sensors. As part of the instant invention, four schemes for delaying and recombining sensor readings are presented.

Figure 1:
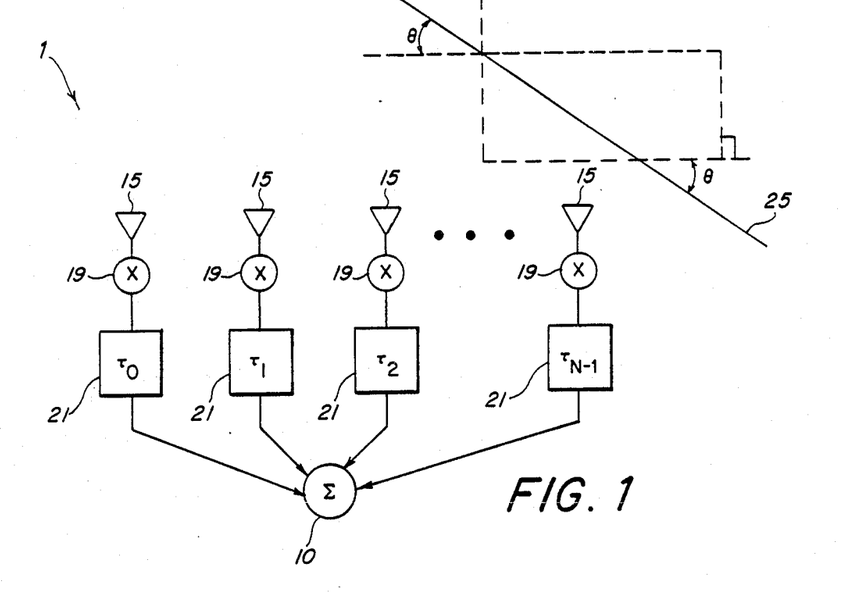
FIG. 1 is a schematic showing a generalized beamforming system.
Figure 2:
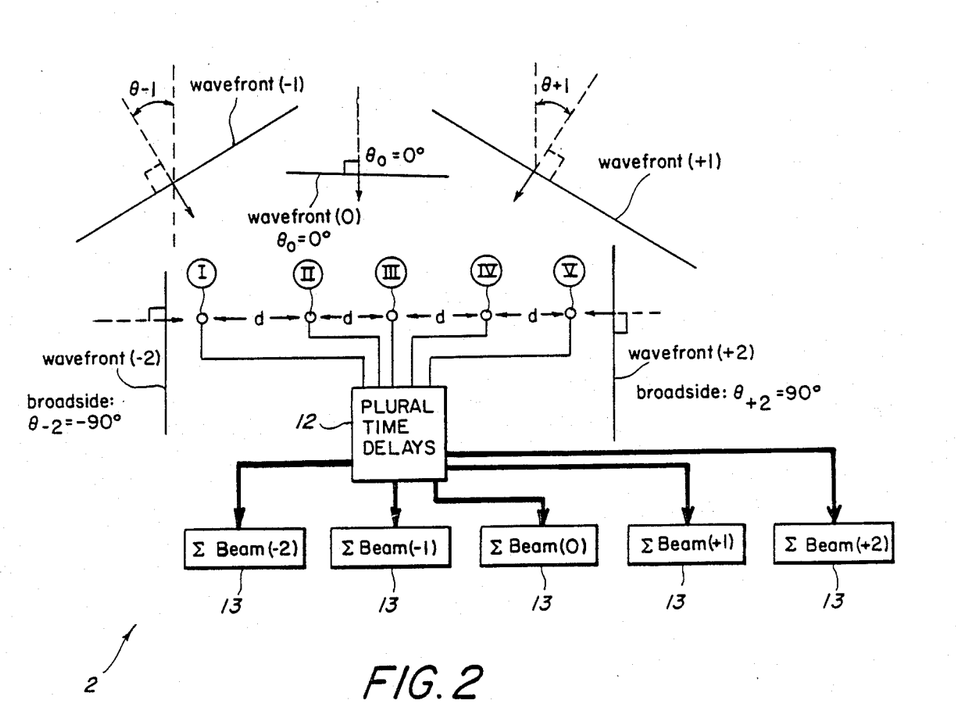
FIG. 2 is a schematic of a system like that of FIG. 1, but whose geometry is simplified.

FIG. 2 shows schematically a particular form 2 of the system in FIG. 1. System 2 has five sensors I through V linearly disposed a constant distance d from one another. This geometrical simplification make the time delays for optimal beamforming especially simple, and thus make simpler explaination of how the various delay and summing schemes of the invention work. The outputs of sensors I through V are subjected to five different sets of preselected time delays by 12, and routes each group of signals belonging to the same set of time delays to one of a plurality of summers 13. In this manner, five different beams corresponding to five different look angles are formed. Member 12 may also have any necessary, conventional, transducing equipment, e.g , sonic or microwave to optical, as well as desired signal multipliers, or conventional clocking circuitry that is required for several of the embodiments.

Taking the velocity of wave propagation as c, the speed with which a wavefront can traverse sensors I through V varies from zero to d/c (zero for a broadside wave—one whose propagation direction is perpendicular to sensor array I through V and which strikes all sensors simultaneously; and d/c for an endfire wave—one whose propagation direction is parallel to the detector array).

For purposes of explanation, the plural time delays 12 are chosen to optimally form beams having propagation delays d/c, $-d/2c$, 0, $+d/2c$, $+d/c$, which correspond to the wavefronts shown in FIG. 2 having incidence angles $\theta_{-2}$, $\theta_{-1}$, $\theta_0$, $\theta_{+1}$, $\theta_{+2}$, and constituting beam numbers $-2$, $-1$, 0, $+1$, $+2$ of system 2 respectively. (The negative numbers indicate wave direction, i.e., waves having incidence angles $\theta_{+1}$ and $\theta_{-1}$ are mirror images of one another.) From system geometry, $\theta_{+2}=90°$ (endfire), $\theta_{+1}=30°$, and $\theta_0=0°$ (broadside). Because the time delays for all beams of system 2 are integer multiples of one another, by making the rate at which sensors I through V are sampled an integer multiple of the shortest time delay, system 2 is well adapted to perform the time delaying function of member 12 digitally, with the attendant advantages inherent in digital processing. For simplicity of explanation, the sampling period of sensors I through V in system 2 is chosen as the time that a signal of interest will traverse distance d for beam 1, i.e. d/2c. In practice, the requirements for adequate waveform sampling would almost always require that the base sampling rate be at least several times this rate. As can be seen from the embodiments below, a higher sampling rate merely requires increased memory capacity of time delay devices 12, without altering the basic teachings of this invention.

Figure 3:
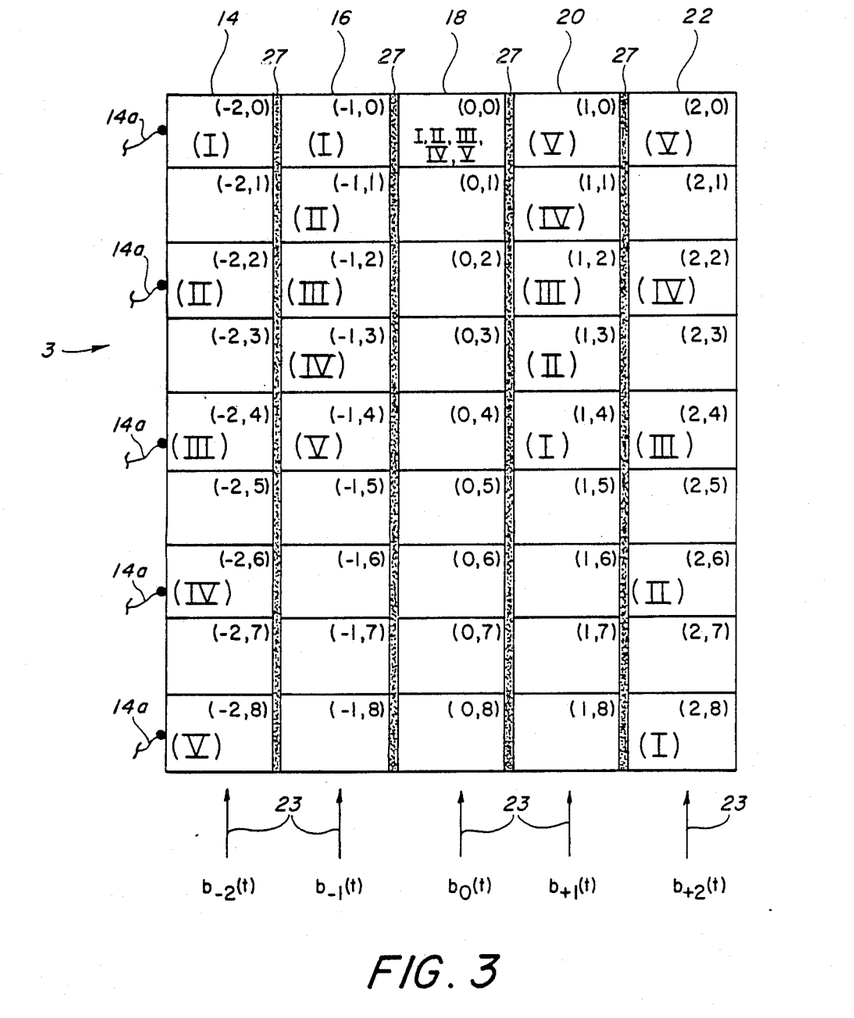
FIG. 3 is a schematic showing the operation of one embodiment of the optical delaying and summing hardware of the instant invention.

FIG. 3 shows a preferred embodiment 3 for performing the delaying and summing functions of devices 12 and 13 of FIG. 2. Device 3 is a plurality of charge coupled devices 14, 16, 18, 20, 22 isolated from each other by insulating layers 27. Each charge coupled device 14, 16, 18, 20, 22 comprises a plurality of charge holding cells (or "buckets") that can store an electric charge and, when provided by the appropriate control signal (which circuitry is conventional, and not shown) can move the stored charge from one cell to an adjacent cell in the direction of arrows 23. Each individual cell of each charge coupled device is denominated by an ordered pair of Arabic numerals, the first Arabic numeral indicating the beam of system 2 which is being formed, the second indicating time delay in a manner explained below. The Roman numerals associated with individual cells indicate fiber optic connections (shown schematically as members 14a of charge coupled device 14, and not shown for the other change coupled devices) to the output of the sensors I through V shown in FIG. 2. For example, a cell labeled with "III" is directly connected by a fiber optic coupler to the output of sensor III in FIG. 2 in a manner to inject into the cell a charge proportional to the output magnitude of sensor III when the output of sensor III is sampled. In operation, both device 3 and the remainder of system 2 are simultaneously clocked (by conventional timing circuits, not shown) at a rate of d/2c. Charge already in cells of device 3 (termed "keep" charge) is shifted to the next adjacent cell in the direction of arrows 17. For example, upon clocking device 3, charge in cell $(-2,1)$ is transferred into cell $(-2, 0)$, charge in cell $(0,5)$ is transferred to cell $(0,4)$, etc. Simultaneously, but out of phase, with this transfer, additional charge proportional to the sensor magnitudes are added to the cells as above described. As can be seen from FIG. 3, charge enters the charge coupled devices at different places at different times, and it is in this manner that time delayed summing of signals from sensors I through V is effected. Take for example beam number $(+1)$ corresponding to the wave-front shown in FIG. 2 having a look angle of $\theta_{+1}=30°$. The wave front being incident on detector I causes a charge proportional to the magnitude of the wave front to be created in cell $(+1,4)$ of charge coupled device 20. A time d/2c later, the wave front has propagated to sensor II where, because d/2c is the sampling period of the system 2 and the clocking period of the device 3, the charge stored in cell $(+1,4)$ is shifted to the cell $(+1,3)$, and the signal generated by the wave front on detector II is transmitted to cell $(+1,3)$ and added to that cell. In this manner, charge representing the detection of the wave front by both sensors I and sensor II is stored in cell $(+1,3)$, i.e., summed in this cell. As is seen from the labelling on charge coupled device 20, this process is repeated as the wave front propagates across the entire detector array, eventually resulting in a charge stored in cell $(+1,0)$ proportional in magnitude to the sum of the signals generated by each sensor I through V where the summed charge can be detected by conventional electronics (not shown) and monitored appropriately. Beam (+2) is formed in the same manner using charge coupled device 22. The time that a wavefront incident at $\theta_{+2}$ takes to travel from one sensor to the next is exactly d/c, and thus the time delay necessary to form this beam coherently is exactly twice that needed to form beam (+1). As seen in FIG. 3, the fiber optic connections (not shown) between the sensors of system 2 and charge coupled device 22 (beam +2) are exactly the same as those for charge coupled device 20 (beam +1) except that cells which are connected to the sensors are spaced twice as far apart, imposing a time delay on summing the charge in device 20 twice that imposed in device 22. For example, cells (+2,8) and (+2,6) which are connected to sensors I and II, respectively, are separated from one another by cell (+2,7), etc. As can be seen from FIG. 2, a wavefront having an incidence angle of $\theta_o = 0°$ strikes the detector array broadside, and there is no time delay between this wave front's arrival at all the detectors. Accordingly, all five detectors are connected to the same cell of charge coupled device 18, which will indicate a coherently added beam only for such a broadside wave front. Charge coupled devices 14 and 16 are associated with sensors I through V in a manner that is the mirror image of the connections for charge coupled devices 22 and 20, and thus coherently detect wave fronts at incidence angles that are mirror images of the wave fronts detected by devices 20 and 22, i.e., $\theta_{-2}$ and $\theta_{-1}$. If system geometry were not linear, causing the associated time delays to no longer be simple integer multiples of one another, one would simply change the spacing between cells in charge coupled devices that are connected to fiber optic couplers to accommodate the new time delays.

Figure 4:
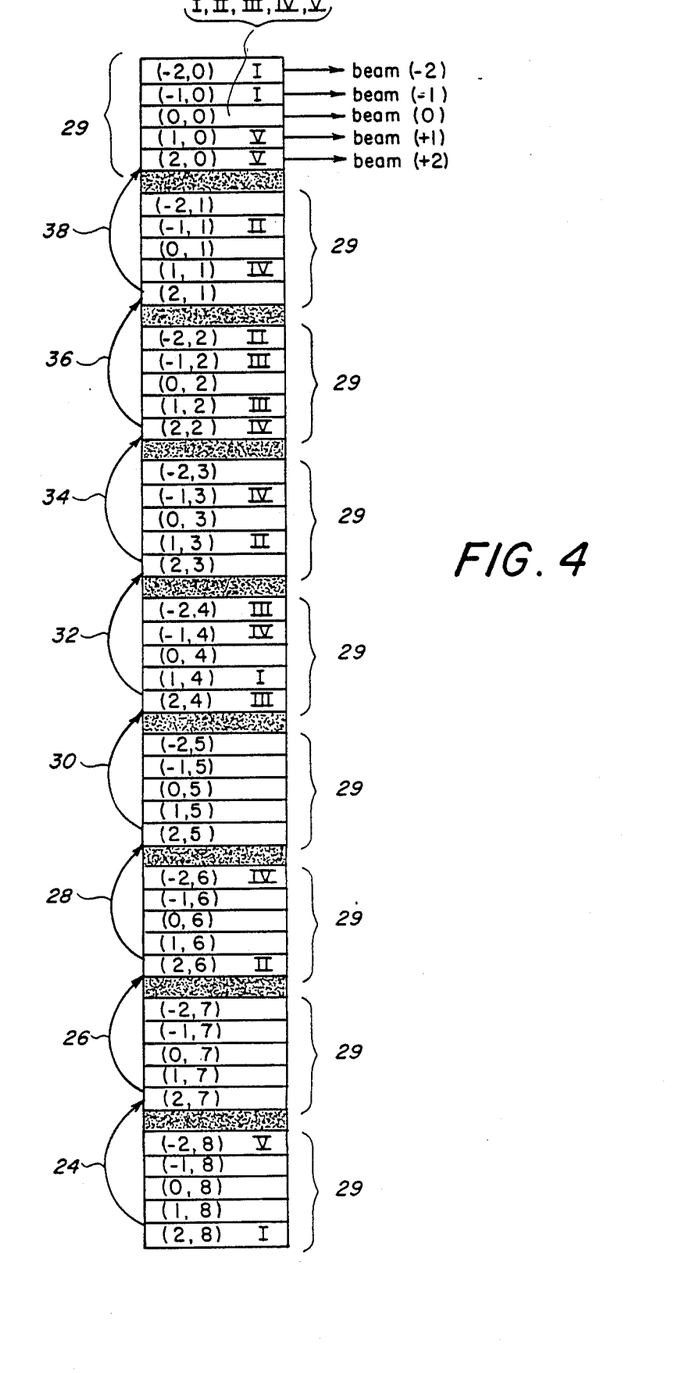
FIG. 4 is a schematic showing the operation of another configuration the delaying and summing device of FIG. 3.

With particular reference to FIG. 4, another form of device 3 of FIG. 3 is shown (by illustrative numeral 4), in which the charge coupled cells are arranged in a manner more akin to devices readily available commercially and more easily assembled in the field. The labeling nomenclature is the same, that is, Roman numerals indicate particular sensors to which particular charged coupled device cells are connected by fiber optic couplers (again, not shown), and ordered pairs in parentheses indicate once again the beam number that the cell contributes toward, and shift index, respectively. The cells are rearranged into a linear array, and subdivided into a plurality of blocks 29 of cells, each cell of each block 29 being associated with one of the five beams of the system. As device 4 is clocked, charge is shifted in the directions of arrows 24, 26, 28, 30, 32, 36, 38. As an example of how charge moves through device 4, consider the cell in the lower most of blocks 29 marked (+2,8). When system 2 is sampled, charge corresponding to the magnitude of the signal detected by sensor I is stored in this cell. That charge is sequentially moved every time period d/2c into other storage cells as indicated by arrows 24-38, i.e., first to cell (+2,7), then to (+2,6) where the signal from sensor II is added, then to cell (+2,5), then to (+2,4) where the signal from sensor III is added, then to (+2,3), then to (+2,2) where the signal from sensor IV is added, then to (+2,1), and, finally to (+2,0) where the signal from sensor V is added to complete the formation of beam (−1). As with device 3, different sets of time delays are readily imposed by changing the spacing between cells that are connected to outputs of sensors I through V.

Figure 5:
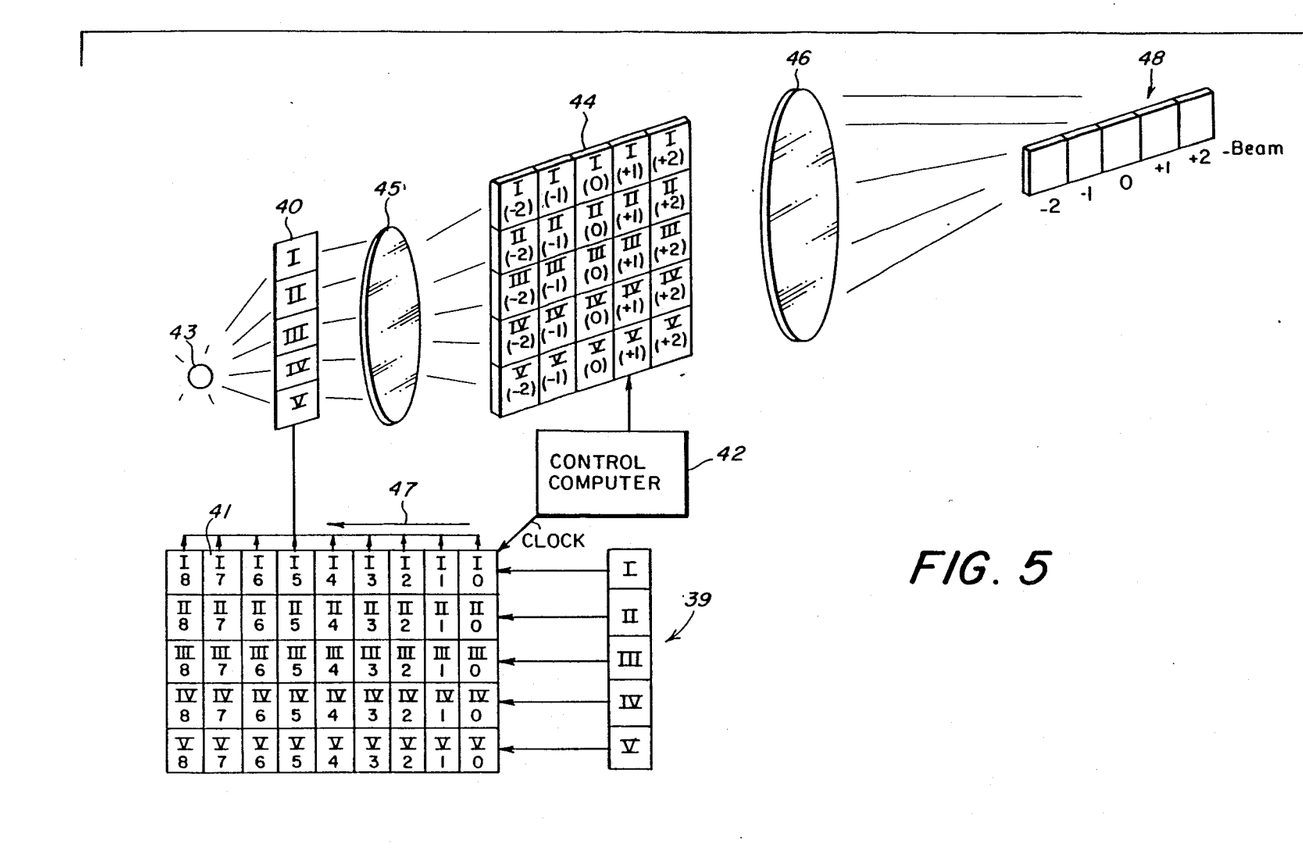
FIG. 5 is a schematic showing a second embodiment of the delaying and summing hardware of the instant invention.

With particular reference to FIG. 5, another form of delay and summer 12 and 13 is shown. The system employs inputs 39 from sensors I through V, buffer memory and shift register 41, digital-optical interface and buffer 40 illuminated by light 43, lenses 45, 46, two-dimensional array 44 of light valves (i.e., an array of pixels which can be made opaque or transparent), and detector array 48. Sampled outputs of sensors I through V are converted into digital form by any conventional transducer (not shown) and input into buffer-shift register 41, where after each sampling period data stored in 41 is shifted column-wise in the direction of arrow 47. During each sampling period, each column in buffer 41 (or "data vector") is sequentially read into buffer-modulator 40. Modulater 40 could be an array of total internal reflection type devices, one for each system detector, each of which modulates illumination from light 43 proportional to an applied voltage in a manner well known in the art. (Also not shown is a conventional digital-analog interface between buffer 41 and modulator 40.) Light passing through modulator 40 and representing the data column of buffer 41 loaded in modulator 40, is spread horizontally onto light valve array 44, (i.e., a liquid crystal television display whose pixels constitute the light valves) in effect reproducing the data vector in modulator 40 as five identical column vectors projected onto light valve array 44. Computer 42, besides clocking shift register-buffer 41, can command individual pixels of array 44 (show schematically as rectangles) to become opaque or transparent. Light that passes through light valve array 44 is focused vertically by lens 46 onto light sensitive array 48. Array 48 is disposed laterally so that lens 46 focuses light passed by each column of array 44 onto one detector of array 48, one column of array 44 corresponding uniquely to one detector of array 48. Lenses 45,46 can be simple and conventional cylindrical or spherical lenses.

In operation, the column-wise shifting of sensor readings in buffer 41 provides the requisite delays, maintaining sampled readings of up to nine sampling periods earlier. During each sampling period, control computer 42 executes a routine by which each column of buffer 41 sequentially maps onto buffer 40, and ultimately onto light valve array 44, whose pixels computer 42 opens or closes in accordance with a look-up table, pre-programmed into its memory, of elements necessary to form each beam of system 2. Thus, as each column of buffer 41 is projected onto valve array 44, computer 42 opens the individual pixels of array 44 that correspond to signals which are necessary components of system beams. For example, column 6 of buffer 41 (i.e., the values of sensors I through V sampled five time periods earlier) has only two components necessary for any system beam, i.e., component IV6 for beam (−2) and component II6 (for beam (+2)); thus when column 6 of buffer 41 is projected onto array 44, computer 42 will opaque all pixels but IV(−2) and II(+2), whose transmitted light is imaged by lens 46 onto detectors (−2) and (+2) respectively of detector array 48. The detectors of array 48 can be any conventional light sensitive devices with conventional circuitry (not shown) for integrating and monitoring these summed outputs. Upon completing this routine for each column in buffer 41, the components of each beam of system 2 has been summed by the appropriate detector of array 48, and the beams formed.

Figure 6:
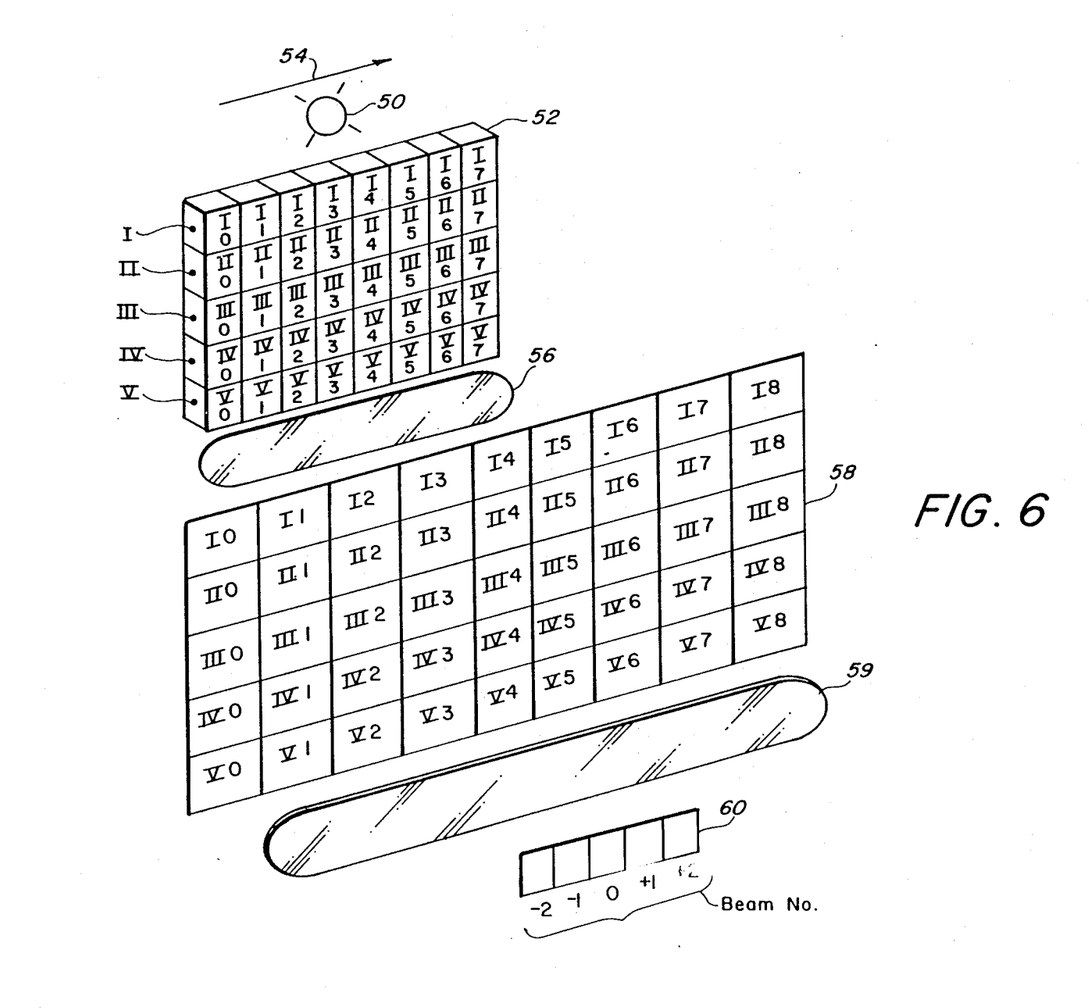
FIG. 6 is a schematic showing a third embodiment of the delaying and summing hardware of the instant invention.

With particular reference to FIG. 6, another scheme for delaying and summing the signals from sensors I through V is shown. This scheme uses a five port Bragg cell 52 illuminated by light source 50, a holographic mask 58, astigmatic focusing lenses 56 and 59, and a plurality 60 of photo-detectors, one for each beam of system 2. Signals from each sensor I through V enter the left side of Bragg cell 52 as indicated on FIG. 6, modulating light from source 50 proportionate to the outputs of the detectors in a manner well known to those skilled in the art. The signals from the sensors propagate in direction 54 along each chamber of Bragg cell 52. The dotted lines in Bragg cells 52 indicating portions of constant phase propagation along direction 54. The labeling nomenclature is as in the earlier embodiments, i.e. Roman numerals referring to particular sensors and arabic numerals referring to number of time periods of delay. For example, that portion of Bragg cell 52 labeled III5 indicates that propagating through this portion of Bragg cell 52 is a signal indicative of the output of sensor III five sampling time periods earlier. Because of the finite time that these signals take to propagate through cell 52, cell 52 constitutes a record of sensor output both for the present and for as long past as a signal takes to traverse cell 52 in direction 54. In this manner, one produces the time delayed signals necessary to form the beams of system 2.

Lens 56, mask 58 and lens 59 co-operate to direct the portions of this optical output of Bragg cell 52 onto the appropriate photo-detector of array 60, one photodetector, and associated monitoring circuitry (the latter not shown), being associated with one beam as in the embodiment of FIG. 5. Lens 56 images the optical output of Bragg cell 52 onto mask 58. The rectangles of mask 58 schematically correspond to the equal phase portions of Bragg cell 52 and represent areas of mask 58 that receive optical signals representing the time delayed signals of sensors I through V. Each rectangle of mask 58 that has projected on it a signal from Bragg cell 52 which is necessary to form a system beam has a holographic grating frequency effective to re-direct incident light onto a pre-selected detector via focusing lens 59, and ultimately on the appropriate detector of array 60. Preferably, lens 59 can be a simple spherical imaging lens disposed to focus light along the length of array 60; by choosing the cutouts of mask 58 to direct light of all signals of each system beam onto the same vertical axis (a different axis for each system beam), lens 59 will vertically image signals on the same axis onto a point, i.e., the appropriate detector of array 60. The principles by which to choose the shape and size of individual holographic gratings necessary to redirect optical signals in this manner is well understood by those skilled in the art, and such mask design is typically done by pre-existing computer programs.

Figure 7:
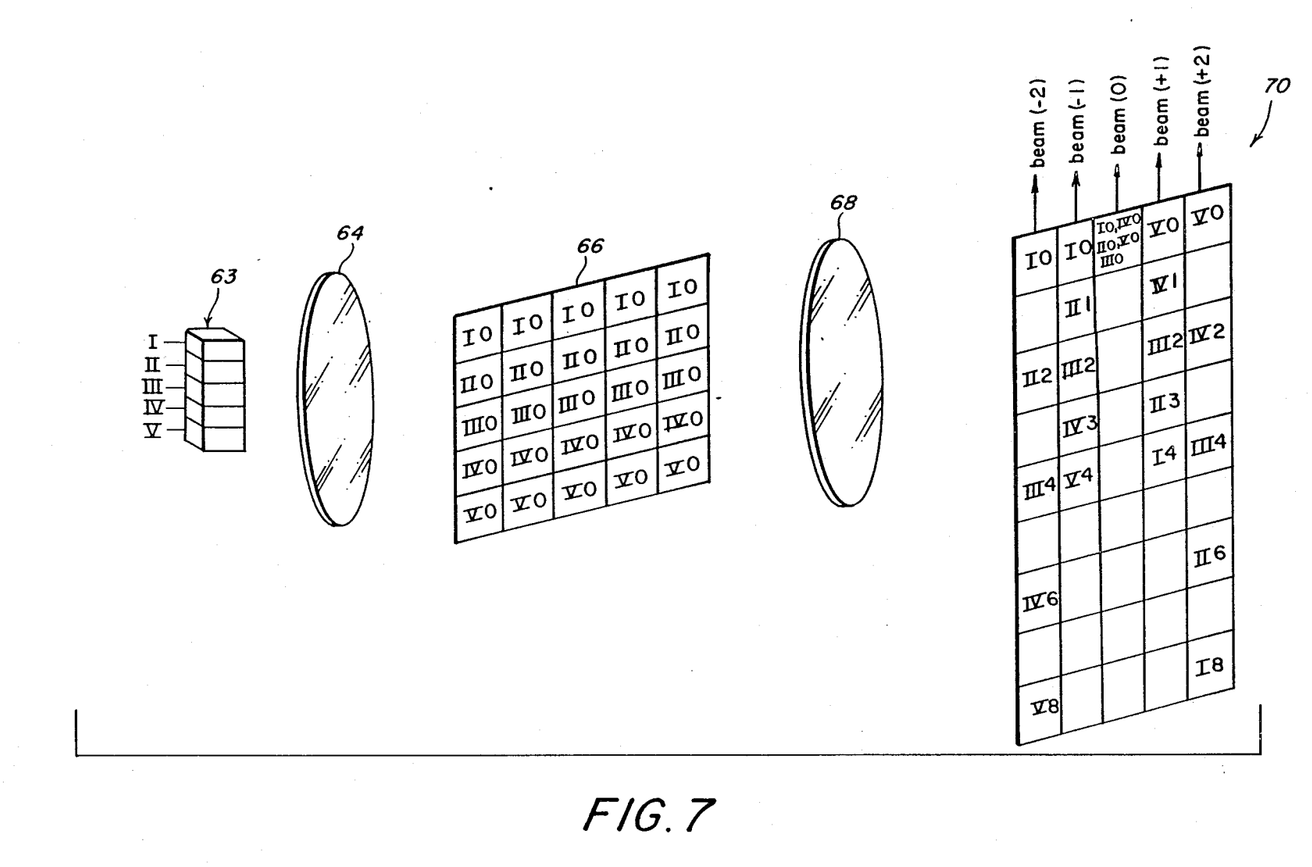
FIG. 7 is a schematic showing a fourth embodiment of the delaying and summing hardware of the instant invention.

With particular reference to FIG. 7, another scheme for delaying and summing signals from system 2 is shown. A plurality of light emitting devices 63 carry instantaneous signals from each sensor I through V and this light is spread horizontally by lens 64 onto holographic mask 66 in the manner shown by the labelling in FIG. 7. (The labeling nomenclature for mask 66 is identical to that used with Bragg cell 52 of FIG. 6.) Mask 66 can be of the same kind as that of the embodiment of FIG. 6, with the particular cutouts chosen to redirect light as below described. Imaging lens 64 spreads out into a horizontal plane the light from light emitting members 63 so that each row of holographic mask 66 has incident upon it the instantaneous value of a single sensor output, row 1 having the output of detector I, row 2 the output of detector II, etc. Focusing lens 68 redirects light passing through holographic mask 66 onto charge coupled device 70. Charge coupled device 70 is virtually identical to the delay and summing device 3 shown in FIG. 3 except that charge is introduced into the plurality 70 charge coupled devices by associated light sensitive circuitry (of a conventional kind, not shown) that proportionally converts light incident on particular cells into electric charge in the particular cells. Otherwise the summing and beamforming is identical to device 3 shown in FIG. 3. Lenses 64, 68, can preferably be spherical or cylindrical lenses, as in previous embodiments.

The invention has been shown in what is considered to be the most practical and preferred embodiments. It is recognized, however, that obvious modifications may occur to those with skill in this art. As is discussed above, and is plain from the foregoing, each disclosed embodiment can impose sets of time delays that are not simple integer multiples of one another to fit any system geometry. Accordingly, the scope of the invention is to be discerned solely by reference to the appended claims, wherein:

What is claimed and desired to be secured by Letters Patent of the United States is:

1. A beamforming system effective to form one or more distinct system beams, said system comprising:
   a plurality of sensors;
   means for storing outputs of said sensors, said means for storing comprising means for transducing said outputs into a plurality of optical outputs;
   means for summing one or more preselected subsets of said optical outputs into said one or more distinct system beams, said one or more preselected subsets corresponding to said one or more distinct system beams;
   wherein said means for storing is effective to delay each output of each subset of said one or more subsets for a time greater than or zero; wherein:
   said system comprises a means for supplying a clocking signal to said means for storing;
   said means for summing comprises a means for detection of said one or more distinct system beams;
   said means for storing comprises one or more pluralities of cell means for storing said one or more preselected subsets, said one or more pluralities of cell means corresponding to said one or more distinct system beams;
   each plurality of said one or more pluralities of cell means having as many as n of cell means denominated by integers 1 through n, respectively, and wherein:
   for i being an integer between 1 and n inclusive, for cell means number 2 through n of said each plurality of cell means, the ith cell means is adapted to transfer any signal stored in said ith cell means to the (ith-1) cell means responsive to the presence of said clocking signal; and
   for i=1, the 1st cell means of said each plurality of cell means is adapted to transfer any signal in said 1st cell means to said means for detection, said means for detection being effective to cause detection of each said one or more distinct system beams responsive to said clocking signal.

2. The system of claim 1, wherein said each plurality of said one or more pluralities of cell means is a charge coupled device, and said plurality of cell means of each said charge coupled device is plurality of charge holding cells.

3. The system of claim 2, wherein said means for storing comprises a plurality of fiber optic connections effective to store said one or more preselected subsets in preselected ones of said charge holding cells.

4. The system of claim 2, wherein said means for storing comprises:
   a first lens;
   a holographic mask comprising a plurality of portions, each of said portion having a pre-selected holographic grating frequency; and
   a second lens; wherein
   said first lens is effective to image each of said plurality of optical outputs onto said holographic mask;
   said first lens and said portions of said holographic mask are adapted to co-operate effectively to direct said one or more preselected subsets onto preselected portions of said second lens, said preselected portions of said second lens are effective to focus each said one or more subsets of said plurality of optical outputs onto a corresponding one of said one or more charge coupled devices;
   said preselected portions of said second lens are further effective to focus each optical output of each said subset onto preselected ones of said charge holding cells, each of said charge holding cells being adapted to store a charge proportional to the sum of all optical outputs focused on said each of charge holding cells.

5. A beamforming system effective to form one or more distinct system beams, said system comprising:
   a plurality of sensors;
   means for storing outputs of said sensors, said means for storing comprising means for transducing said outputs into a plurality of optical outputs;
   means for summing one or more preselected subsets of said optical outputs into said one or more distinct system beams, and one or more preselected subsets corresponding to said one or more distinct system beams;
   wherein said means for storing is effective to delay each output of each subset of said one or more subsets for a time greater than or equal to zero;
   wherein said means for storing comprises:
   an array of light valves;
   means for imaging said plurality of optical outputs onto said array of light valves;
   means for selectively opening each valve of said array of light valves effective to permit said plurality of optical outputs to pass through said array of light valves;
   wherein said means for storing further comprises a means for separating said plurality of optical outputs passes by said light valves into said subsets, said means for summing being effective to form said one or more distinct system beams responsive to said means for separating;
   wherein said array of light valves is a liquid crystal television display, said means for transducing is a light modulator and said means for storing comprises:
   means for generating periodic clock signals;
   first and second lenses, said second lens being said means for separating;
   an array of shift registers having an input and output, said array of shift registers being effective to store a plurality of data vectors, said shift registers being effective to shift each vector of said plurality of data vectors on register towards said output from said input responsive to the presence of each clock signal of said periodic clock signals, the data vector in said output being lost responsive to said presence of said each clock signals;
   means for sampling the outputs of said plurality of sensors responsive to said presence of said each clock signal effective to form a data vector of the sampled outputs, said data vector of said sampled outputs being input into said input of said array of said shift registers;
   wherein said light modulator is effective, between consecutive signals of said periodic clock signals, to:
   sequentially map each data vector in said array of shift registers into said light modulator effective to transducer said each data vector into an optical data vector, all such optical data vectors constituting said plurality of optical outputs; and
   said first lens is effective to image said each optical data vector onto said liquid crystal television display.

6. A beamforming system effective to form one or more distinct system beams, said system comprising:
   a plurality of sensors;
   means for storing outputs of said sensors, said means for storing comprising means for transducing said outputs into a plurality of optical outputs;
   means for summing one or more preselected subsets of said optical outputs into said one or more distinct system beams, said one or more preselected subsets corresponding to said one or more distinct system beams;
   wherein said means for storing is effective to delay each output of each subset of said one or more subsets for a time greater than or equal to zero;
   wherein said means for storing comprises a Bragg cell, said Bragg cell being effective to support, responsive to said sensors, a plurality of signals propagating across said bragg cell, said Bragg cell constituting said means for transducing and being effective to transducer said plurality of signals propagating across said Bragg cell into said plurality of optical outputs.

7. The system of claim 8, wherein said means for summing is one or more optical summers corresponding to said one or more distinct system beams, and said means for storing comprises:
   a holographic mask having a plurality of portions, each of said portions having a preselected grating frequency; and
   a first and a second lens; wherein
   said first lens is effective to image said plurality of optical outputs of said Bragg cell onto preselected ones of said portions of said holographic mask;
   said portions of said holographic mask are effective to redirect said plurality of optical outputs onto preselected portions of said second lens;
   said second lens is adapted to focus said one or more subsets onto corresponding ones of said one or more optical summers effective to form said one or more distinct system beams.

* * * * *